June 19, 1934.  F. A. BOLLINGER  1,963,932
VEHICLE WHEEL STRUCTURE
Filed Dec. 10, 1932

INVENTOR
FRED A. BOLLINGER

Ely & Barrow

ATTORNEYS

Patented June 19, 1934

1,963,932

UNITED STATES PATENT OFFICE 1,963,932

VEHICLE WHEEL STRUCTURE

Frederick A. Bollinger, Akron, Ohio, assignor to The Firestone Tire & Rubber Company, Akron, Ohio, a corporation of Ohio Application December 10, 1932, Serial No. 646,643

2 Claims. (Cl. 295—12)

This invention relates to vehicle wheel structures, and more especially it relates to improved construction of rail car wheels, such as are equipped with pneumatic or cushion tires and a rail-engaging flange at one side thereof.

The chief objects of the invention are to facilitate the removal of tires from rail car wheels of the character mentioned; and to provide a rail car wheel construction permitting the use of pneumatic tires mounted upon standard demountable tire-rims. More specifically the invention aims to provide for the easy removal of tires from rail car wheels without removing the rail engaging flanges at the side of the tire.

Figure 1:
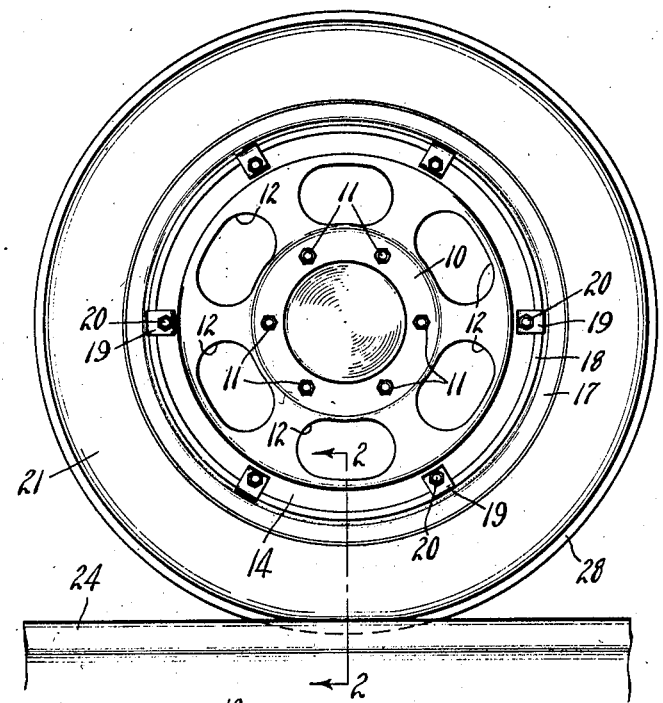
Figure 2:
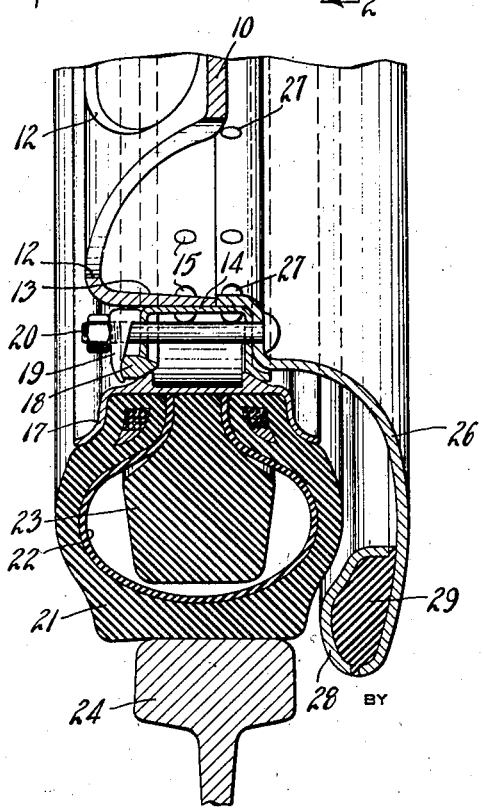

Of the accompanying drawing:

Figure 1 is a front-side elevation of a rail car wheel structure embodying the invention in its preferred form, including a pneumatic tire on said wheel; and Figure 2 is a section on the line 2—2 of Figure 1.

Referring to the drawing, 10 is a vehicle wheel that is mounted upon an axle of a rail car (not shown) by means of bolts 11, 11. The wheel 10 comprises a metal disc that is suitably dished as shown, and may be formed with apertures 12, 12 to reduce its weight. The perimeter of the disc is formed with a relatively wide, circumferential flange 13 upon which is mounted a channel shaped metal felly 14, the latter being permanently secured to the flange 13 as by welding, or by the rivets 15, 15 as shown.

The felly 14 is suitably shaped to carry a split, demountable tire rim 17 of usual construction, the rim being secured on the felly by means of an endless or split retaining ring 18 that is wedged between one margin of the felly and the rim by the usual clips 19, 19, the latter being mounted upon respective bolts 20 that extend transversely through the felly. Mounted upon the tire rim 17 is a pneumatic tire 21 including an inner tube 22, and preferably including an annular cushion member 23 of solid rubber of somewhat smaller size than the interior of the tube, and so arranged as determinately to limit deflection of the tire under heavy loads or when it is deflated from puncture or other cause. The tread of the tire is suitably shaped to fit upon the rail head 24 of a standard track rail.

The improved wheel has a rail-engaging flange 26 on the inner side thereof adapted to engage the inner side of rail head 24 to prevent the vehicle from leaving the tracks. The flange 26 is an annular, transversely-arcuate structure that has its inner peripheral portion angularly shaped so as to fit upon the inner periphery and an adjacent lateral face of the felly 14. The said flange is permanently secured to the felly by a circumferential series of rivets 27, 27 that extend through the inner peripheral wall of the felly and abutting portion of the flange. The bolts 20 that extend transversely through the felly 14 also extend through that portion of the flange 26 that abuts the lateral face of the felly, the heads of the said bolts bearing against said flange. The arrangement is such that the bolts 20 supplement the rivets 77 in securing the flange 26 to the felly 14, and are so positioned as to give added rigidity to said flange.

Between the outer peripheral portion of the flange 27 and the rail head 24 is a wear plate 28 adapted, upon occasion, to bear against the rail head, said plate being attached to the flange by an interposed cushion of rubber 29 that is vulcanized to both of said members and constitutes the sole connection therebetween. The presence of the rubber cushion 29 between flange 26 and wear plate 28 prevents transmission of vibration from the latter to the flange and thence to the wheel, and it deadens any sound set up by the engagement of the wear plate with the rail head, with the result that quietness of operation is assured.

It will be seen that the invention provides for the use of standard tire rim equipment of a rail car wheel whereby the mounting and dismounting of tires is facilitated, and the other objects of the invention, as set out in the foregoing statement of objects, are achieved.

Modification may be resorted to without departing from the spirit of the invention or the scope of the appended claims, which are not limited wholly to the specific construction shown and described.

What is claimed is:

1. A vehicle wheel structure for rail cars which comprises a metal wheel disc, a metal felly permanently mounted upon the periphery thereof, a demountable tire rim mounted upon said felly, a tire on said rim, means for retaining said rim on said felly, an annular rail-engaging flange disposed laterally of said tire, the inner peripheral portion of said flange engaging the inner periphery of the felly and a side thereof, and means for permanently securing the flange to the inner periphery of the felly, the rim-retaining means supporting the flange at the side of the felly.

2. A vehicle wheel structure for rail cars which comprises a metal wheel disc, a metal felly mounted upon the periphery thereof, a rail-engaging flange mounted upon said felly, the inner peripheral portion of the flange engaging the inner peripheral wall of the felly and an adjacent side thereof, means permanently securing said flange to said inner peripheral wall of the felly, a demountable tire rim on the felly, a tire on said rim, and a circumferential series of bolts for retaining the tire rim on the felly, said bolts also engaging the said flange to hold it against the lateral wall of the felly.

FREDERICK A. BOLLINGER.